US010929472B2

United States Patent
Huang et al.

(10) Patent No.: US 10,929,472 B2
(45) Date of Patent: Feb. 23, 2021

(54) METHODS, DEVICES AND NON-TRANSITORY COMPUTER-READABLE MEDIUM FOR PARAMETER OPTIMIZATION

(71) Applicant: INDUSTRIAL TECHNOLOGY RESEARCH INSTITUTE, Hsinchu (TW)

(72) Inventors: Po-Yu Huang, Tainan (TW); Hong-Chi Ku, Xihu Township (TW); Sen-Chia Chang, Hsinchu (TW); Te-Ming Chen, Taipei (TW); Pei-Yi Lo, Zaoqiao Township (TW)

(73) Assignee: Industrial Technology Research Institute, Hsinchu (TW)

( * ) Notice: Subject to any disclaimer, the term of this patent is extended or adjusted under 35 U.S.C. 154(b) by 428 days.

(21) Appl. No.: 15/857,148

(22) Filed: Dec. 28, 2017

(65) Prior Publication Data

US 2019/0171776 A1 Jun. 6, 2019

(30) Foreign Application Priority Data

Dec. 1, 2017 (TW) .............................. 106142286 A

(51) Int. Cl.
*G06F 16/903* (2019.01)
*G06N 5/02* (2006.01)
*G06N 20/00* (2019.01)

(52) U.S. Cl.
CPC ....... *G06F 16/90335* (2019.01); *G06N 5/022* (2013.01); *G06N 20/00* (2019.01); *Y02P 90/30* (2015.11)

(58) Field of Classification Search
CPC .............................................. G06F 16/90335
See application file for complete search history.

(56) References Cited

U.S. PATENT DOCUMENTS

| 6,564,116 | B2 | 5/2003 | Wang et al. |
| 6,826,549 | B1 | 11/2004 | Marks et al. |
| 7,272,584 | B2 | 9/2007 | Diedrich et al. |
| (Continued) | | | |

FOREIGN PATENT DOCUMENTS

| CN | 106815462 A | 6/2017 |
| TW | I267012 B | 11/2006 |
| TW | I287244 B | 9/2007 |
| TW | 201246273 A | 11/2012 |
| TW | I549007 | 9/2016 |

OTHER PUBLICATIONS

Turng et al., "Computer aided process and design optimization for injecting moulding", 2002 (Year: 2002).*

(Continued)

*Primary Examiner* — Dawaune A Conyers
(74) *Attorney, Agent, or Firm* — Muncy, Geissler, Olds & Lowe, P.C.

(57) ABSTRACT

A parameter optimization method includes: a parameter search is performed on an input parameter, an output response value and a target value through a plurality of optimization schemes to search for a plurality of candidate recommended parameters. Each optimization scheme is assigned to a weight value according to user historical decision information. At least one recommended parameter is selected from the candidate recommended parameters according to the weight values. An user interface is provided for a user to input a decision instruction. A new input parameter is selected from the at least one recommended parameter according to the decision instruction; the new input parameter is inputted into the target system; and a new output response value is evaluated whether meets a specification condition. The user historical decision information is updated based on the decision instruction to adjust the weight values.

18 Claims, 6 Drawing Sheets

(56) References Cited

U.S. PATENT DOCUMENTS

| | | | |
|---|---|---|---|
| 7,356,518 | B2 | 4/2008 | Bonabeau et al. |
| 8,745,036 | B2 | 6/2014 | Burger |
| 2006/0010117 | A1 | 1/2006 | Bonabeau et al. |
| 2006/0271210 | A1* | 11/2006 | Subbu ............... G06K 9/623 700/44 |
| 2009/0076988 | A1 | 3/2009 | Stanelle |
| 2016/0196492 | A1* | 7/2016 | Johnson ............. G06N 20/00 706/12 |
| 2016/0372000 | A1* | 12/2016 | Taguchi ............. G06Q 10/101 |

OTHER PUBLICATIONS

Ferreira et al., "Box-Behnken design: An alternative for the optimization of analytical methods," Analytica Cimica Acta 597 (2007) pp. 179-186.

Chen et al., "Exploring Optimal Controller Parameters for Complex Industrial Systems," The $5^{th}$ Annual IEEE International Conference on Cyber Technology in Automation, Control and Intelligent Systems, Jun. 8-12, 2015, pp. 383-388.

Andrisano et al., "Design of Simulation Experiments method for Injection Molding process optimiztion," Proceedings of the IMProVe 2011, International conference on Innovative Methods in Product Design, Jun. 15-17, 2011, pp. 476-486.

Zhou et al., "Process Optimization of Injection Molding Using an Adaptive Surrogate Model with Gaussian Process Approach," Polymer Engineering and Science, 2007, pp. 685-694.

Changyu et al., "Optimization of injection molding process parameters using combination of artificial neural network and genetic algorithm method," Journal of Materials Processing Technology, 183 (2007) pp. 412-418.

\* cited by examiner

METHODS, DEVICES AND NON-TRANSITORY COMPUTER-READABLE MEDIUM FOR PARAMETER OPTIMIZATION

This application claims the benefit of Taiwan application Serial No. 106142286, filed Dec. 1, 2017, the subject matter of which is incorporated herein by reference.

TECHNICAL FIELD

The disclosure relates to methods, devices and non-transitory computer-readable mediums for optimizing parameters of a target system.

BACKGROUND

With the continuous improvement of semiconductor process technology, as the process advanced, the research and development cost and the equipment cost become higher. In order to make the product timely release with the research and development schedule, how to optimize the process parameters become the key.

Generally, the parameter optimization methods can be broadly divided into two types, one is data-driven decision making method and the other one is human expert decision making method. The former requires a lot of experimental data for the machine for automated learning. Therefore, in applications with only a few data (or high cost of data acquisition), this method yields poor parameter solutions. The latter mostly needs the experience and knowledge of engineers/implementers to find the optimal parameters through trial and error. However, this method depends on the professional experience of engineers/implementers and lacks of automated learning mechanism.

Therefore, how to improve the execution efficiency of the parameter optimization method is one of the topics to be solved in the industry.

SUMMARY

The disclosure relates to methods, devices and non-transitory computer-readable mediums for optimizing parameters of a target system. According to the embodiments of the disclosure, in implementing a data-driven decision-making based optimization scheme, a user feedback mechanism is introduced. A plurality of candidate recommended parameters are generated by using a plurality of different optimization schemes. Then, the recommendation mechanism for the candidate recommended parameters is automatically corrected and adjusted according to the user's decision instruction and the user historical decision information, thereby improving the convergence of parameter optimization speed.

According to an aspect of the disclosure, a parameter optimization method is provided. The parameter optimization method includes the following steps. At least one input parameter input into a target system, at least one output response value of the target system in response to the at least one input parameter and at least one target value corresponding to the at least one output response value are retrieved. A parameter search is performed on the at least one input parameter, the at least one output response value, and the at least one target value through a plurality of optimization schemes to search for a plurality of candidate recommended parameters from a numerical search range in an input parameter space. Each of the optimization schemes is assigned to a weight value according to user historical decision information. At least one recommended parameter is selected from the candidate recommended parameters according to the weight values assigned to the optimization schemes. An user interface is provided for a user to input a decision instruction for the at least one recommended parameter. At least one new input parameter is selected from the at least one recommended parameter according to the decision instruction; the at least one new input parameter is inputted into the target system; and at least one new output response value generated by the target system in response to the at least one new input parameter is evaluated whether meets a specification condition. The user historical decision information is updated based on the decision instruction to adjust the weight values corresponding to the optimization schemes.

According to another aspect of the disclosure, a non-transitory computer-readable storage medium is provided. The non-transitory computer-readable storage medium stores at least one executable command which, when executed by an electronic device, causes the electronic device to execute the following operations. At least one input parameter input into a target system, at least one output response value of the target system in response to the at least one input parameter and at least one target value corresponding to the at least one output response value are retrieved. A parameter search is performed on the at least one input parameter, the at least one output response value, and the at least one target value through a plurality of optimization schemes to search for a plurality of candidate recommended parameters from a numerical search range in an input parameter space. Each of the optimization schemes is assigned to a weight value according to user historical decision information. At least one recommended parameter is selected from the candidate recommended parameters according to the weight values assigned to the optimization schemes. An user interface is provided for a user to input a decision instruction for the at least one recommended parameter. At least one new input parameter is selected from the at least one recommended parameter according to the decision instruction; the at least one new input parameter is inputted into the target system; and at least one new output response value generated by the target system in response to the at least one new input parameter is evaluated whether meets a specification condition. The user historical decision information is updated based on the decision instruction to adjust the weight values corresponding to the optimization schemes.

According to yet another aspect of the disclosure, a parameter optimization device suitable for optimizing parameters of a target system is provided. The parameter optimization device includes a memory and a processor. The processor is coupled to the memory and is configured to execute the following operations. At least one input parameter input into a target system, at least one output response value of the target system in response to the at least one input parameter and at least one target value corresponding to the at least one output response value are retrieved. A parameter search is performed on the at least one input parameter, the at least one output response value, and the at least one target value through a plurality of optimization schemes to search for a plurality of candidate recommended parameters from a numerical search range in an input parameter space. Each of the optimization schemes is assigned to a weight value according to user historical decision information. At least one recommended parameter is selected from the candidate recommended parameters according to the weight values assigned to the optimization schemes. An user interface is provided for a user to input a decision instruction for the at least one recommended parameter. At least one new input parameter is selected from the at least one recommended parameter according to the decision instruction; the at least one new input parameter is inputted into the target system; and at least one new output response value generated by the target system in response to the at least one new input parameter is evaluated whether meets a specification condition. The user historical decision information is updated based on the decision instruction to adjust the weight values corresponding to the optimization schemes.

For a better understanding of the above and other aspects of the disclosure, the embodiments are described below in detail with reference to the accompanying drawings.

Figure 1:
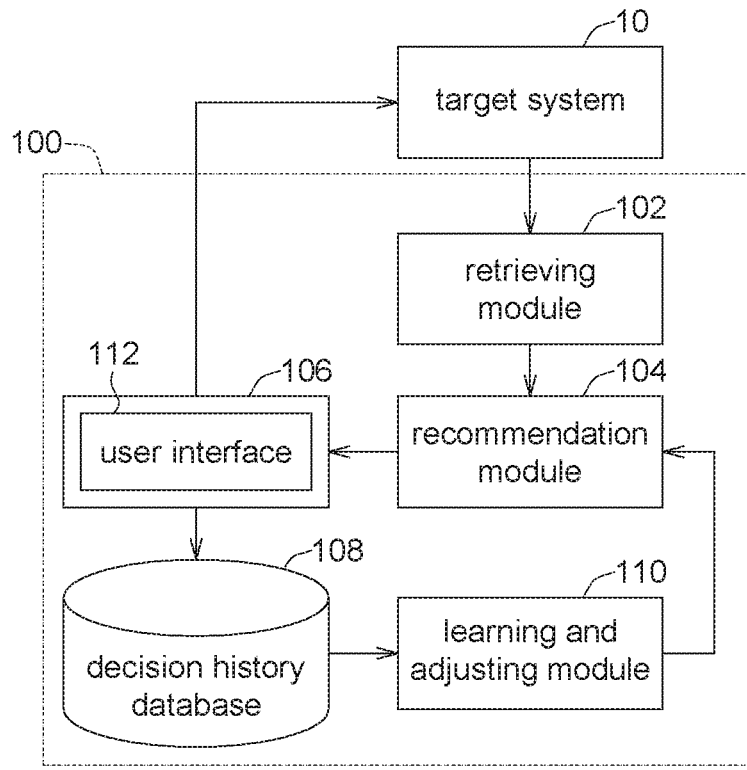
FIG. 1 is an exemplary block diagram of a parameter optimization device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 is an exemplary block diagram of a parameter optimization device 100 according to an embodiment of the disclosure. The parameter optimization device 100 may perform parameter optimization on the target system 10. The parameter optimization device 100 includes a retrieving module 102, a recommendation module 104, a user feedback module 106, a decision history database 108, and a learning and adjusting module 110. The target system 10 may be a manufacturing system, a machine or any other software/hardware object that the system output response needs to be improved by calibrating the related parameters. The parameter optimization device 100 may be implemented as an electronic device including a memory and a processor coupled to the memory. The memory may store programs, instructions, data and/or files that the processor may obtain or execute, so that the processor may implement the parameter optimization method according to the embodiments of the disclosure. The retrieving module 102, the recommendation module 104, the user feedback module 106, the decision history database 108, and the learning and adjusting module 110 may be implemented through software (such as programs, instructions and data files), hardware (such as logic circuits, integrated circuits, wafers, circuit boards) or the combination thereof that are included in the processor and operate under the control of the processor to perform the respective functions.

The retrieving module 102 retrieves at least one input parameter input into the target system 10, at least one output response value of the target system 10 in response to the at least one input parameter, and at least one target value corresponding to the at least one output response value. For example, the retrieving module 102 may obtain the input parameters, the output response values and corresponding target values of a machine, a process or a system by reading files, using a data retrieving card interface or accessing a database system.

Take an injection molding process as an example. The input parameters may be the process parameters such as the injection time, the melting temperature, the mold temperature and the mold closing pressure. The output response values may include the molding quality indicators, such as warp values.

The target value may be defined by an expected specification or a known solution. The process of parameter optimization usually refers to how to find out the optimal input parameter solution, so that the output response value of the target system 10 is able to meet the specification conditions, e.g., keeping the difference between the output response value and the expected target value within a tolerable range, wherein the degree to which the output response value meets the specification condition may be evaluated by an overall performance index.

The recommendation module 104 is configured to performing a parameter search on the input parameters, the output response values and the target values through a plurality of optimization schemes to search for a plurality of candidate recommended parameters from a numerical search range in an input parameter space. The input parameter space refers to the value range of the input parameters. Different optimization schemes may refer to different optimization algorithms, or different settings/search strategies under the same optimization algorithm. The optimization algorithm may be, but not limited to, a sequential search optimization algorithm such as Bayesian optimization algorithm and evolutionary algorithm. Because different optimization schemes search for parameters based on different optimization algorithms or search strategies, searching for parameters according to different optimization schemes may result in different input parameter solutions, that is, a plurality of candidate recommended parameters.

The recommendation module 104 may assign each of the optimization schemes a weight value according to user historical decision information, and select at least one recommended parameter from the candidate recommended parameters according to the weight values assigned to the optimization schemes.

The decision history database 108 may store the user historical decision information. The decision history database 108 may be, for example, a memory in the parameter optimization device 100. In another embodiment, the decision history database 108 may be a cloud storage device or an external storage device not included in the parameter optimization device 100.

The user feedback module 106 may provide an user interface 112 for user operation. The user interface 112 is a human-machine interface provided for the user to input a decision instruction for each of the recommended parameters, such as an acceptance, a rejection or not comment. It should be noted that the term "user" as used herein includes, for example, a person or entity that owns the parameter optimization device 100; a person or entity that operates or utilizes the parameter optimization device 100; or a person or entity that is otherwise associated with the parameter optimization device 100. It is contemplated that the term "user" is not intended to be limiting and may include various examples beyond those described.

According to the decision instruction, the user feedback module 106 selects at least one new input parameter from the recommended parameters, and inputs the new input parameter to the target system 10 to evaluate whether the new output response value generated by the target system 10 in response to the new input parameter satisfies a specification condition. If the specification condition is satisfied, it means that the suitable/optimal input parameter solution has been found, and the parameter optimization is completed. On the other hand, the user feedback module 106 may add the newly acquired data (e.g., the input parameters, the output response values and the determination result of whether the specification condition is satisfied) to the decision history database 108 to provide the learning and adjusting module 110 for learning and adjustment.

The learning and adjusting module 110 may update the user historical decision information with the decision instruction input by the user in all previous decisions, so as to dynamically adjust the weight value corresponding to each optimization scheme. For example, if the user repeatedly rejects a certain optimization scheme, the decision instruction corresponding to the rejection decision will be recorded in the decision history database 108 and become part of the user historical decision information. The learning and adjusting module 110 may weaken the weight value of the optimization scheme according to the user historical decision information, so that the candidate recommended parameters found by the optimization scheme will not be selected as the recommended parameters; alternatively, the candidate recommended parameters found by the optimization scheme may be given a lower recommended ranking. Conversely, if the user accepts a certain optimization scheme several times, the learning and adjusting module 110 may strengthen the weight value of the optimization scheme, so that the candidate recommended parameters provided by the optimization scheme can be easily selected as the recommended parameters, or have a higher recommended ranking.

The cooperation between the abovementioned modules can be performed recursively until the input parameter solution may make the output response value of the target system meet the specification condition and complete the parameter optimization.

Figure 2:
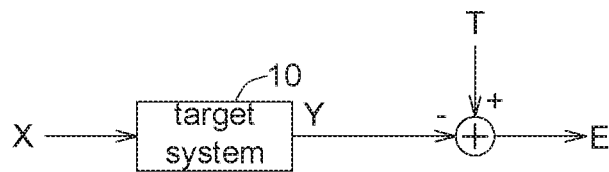
FIG. 2 is a system model graph plotted based on the input parameter of the target system and the overall performance index.
Figure 2:
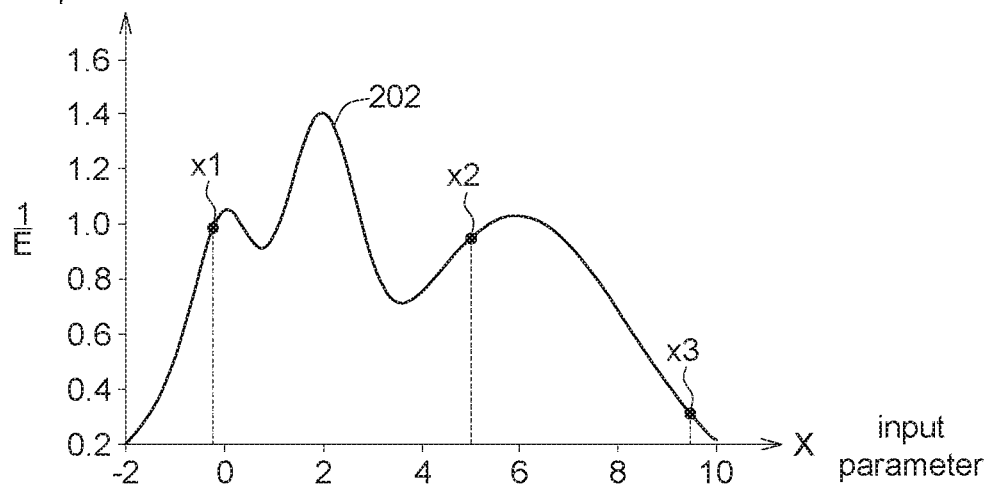

FIG. 2 is a system model graph plotted based on the input parameter (X) of the target system 10 and the overall performance index. In the example of FIG. 2, three input parameters x1=−0.222, x2=5.030 and x3=9.468 are input to the target system 10. The target system 10 generates the corresponding output response values (Y), such as y1, y2 and y3, in response to the input parameters x1, x2 and x3. Each output response y1, y2, y3 may be calculated with a target value T to obtain the overall performance index. In the non-limiting example, the overall performance index is expressed as the reciprocal of an error (1/E), where the error (E), for example, may refer to the difference between the output response value (Y) and the target value T. If the model of the target system 10 is defined by such overall performance index, the system model of the target system 10 may be illustrated as a curve 202.

The retrieving module 102 may calculate the overall performance index (e.g., the reciprocal of the error) for the output response values y1, y2 and y3 of the target system 10 responding to the input parameters x1, x2 and x3 according to the input parameters x1, x2, x3, the output response values y1, y2, y3 and the target value T, as shown in the following table:

TABLE 1

| Input parameter (X) | Reciprocal of the error (1/E) |
|---|---|
| x1 = −0.222 | 0.981 |
| x2 = 5.030 | 0.948 |
| x3 = 9.468 | 0.311 |

It can be understood that, although in FIG. 2 the overall performance index for evaluating the target system 10 in response to the input parameters x1, x2 and x3 is represented as the reciprocal of the error (1/E), the disclosure is not limited thereto. The overall performance index may be implemented as any parameter determined by the output response value and the target value, which reflects the degree of satisfaction of the specification condition, such as the integral squared error (ISE).

Figure 3:
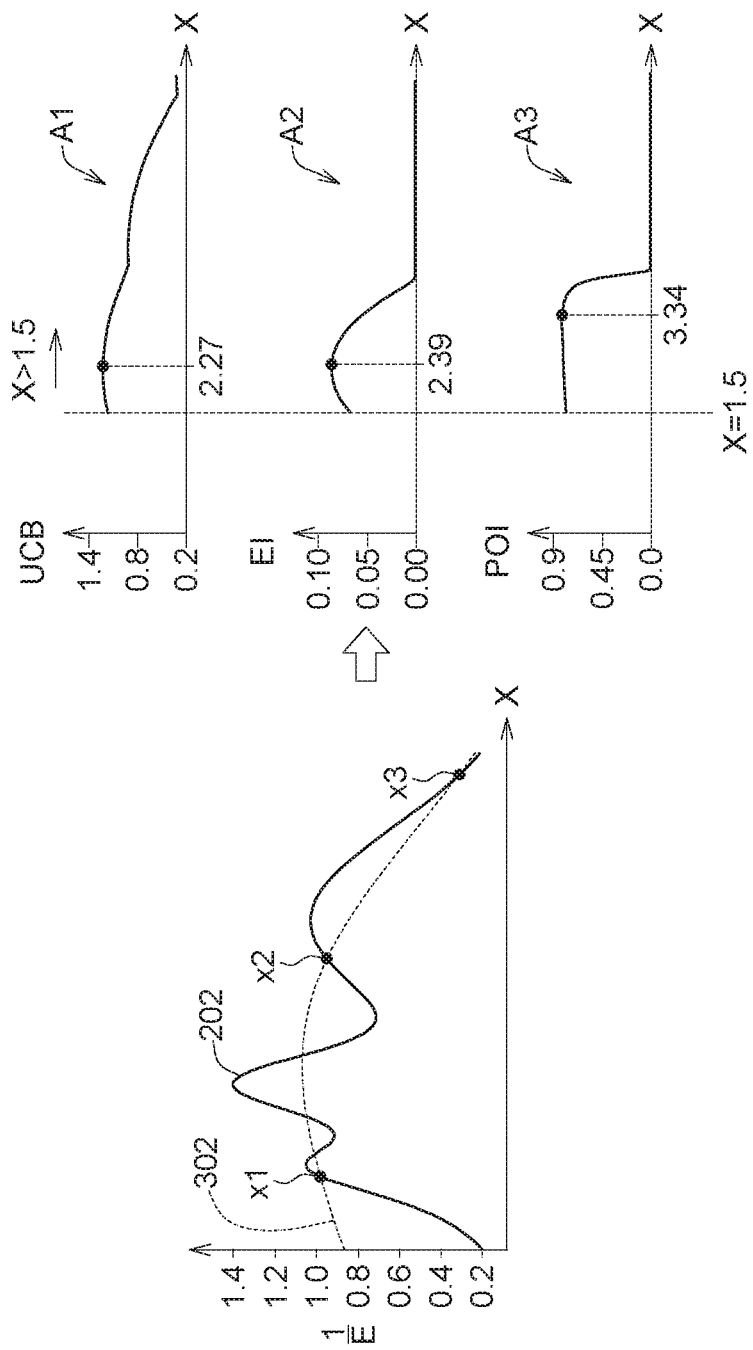
FIG. 3 shows a schematic diagram of the recommendation module that generates candidate recommended parameters based on different optimization schemes.

FIG. 3 shows a schematic diagram of the recommendation module 104 that generates candidate recommended parameters based on different optimization schemes. Different optimization schemes may refer to different optimization algorithms, or different settings/search strategies under the same optimization algorithm. For example, the recommendation module 104 may establish a prediction model according to the input parameters, the output response values and the target values. Under the prediction model, the recommendation module 104 performs a parameter search based on a plurality of search strategy conditions to obtain the corresponding candidate recommended parameters. For example, the recommendation module 104 may search for the candidate recommended parameters corresponding to the prediction model from a plurality of search strategy conditions to generate a candidate recommended parameters set.

The prediction model may refer to a statistical model constructed based on an optimization algorithm. The prediction model is used to predict a real system model of the target system 10 (as shown by the curve 202) based on known input parameters and the corresponding output response values and the target values. As shown in FIG. 3, the curve 302 represents a prediction model constructed by Bayesian optimization algorithm with known input parameters x1, x2 and x3. After constructing the prediction model, the recommendation module 104 may search for parameters according to one or more specific search strategy conditions to find possible optimal input parameter solutions (i.e., the candidate recommended parameters).

The search strategy condition may refer to a overall performance index/function for obtaining the possible optimal input parameter solution. In an embodiment, the search strategy condition may be represented by an acquisition function, which includes improvement-based approaches and uncertainty-based approaches. The former includes, for example, an expected improvement (EI) acquisition function, a probability of improvement (POI) acquisition function, etc. The latter includes, for example, an upper confidence bound (UCB) acquisition function.

Taking FIG. 3 as an example, in the numerical search range of X>1.5, the candidate recommended parameters are obtained respectively from the Bayesian optimization prediction model according to different search strategy conditions A1, A2, and A3. The search strategy condition A1 is a UCB acquisition function, the search strategy condition A2 is an EI acquisition function, and the search strategy condition A3 is a POI acquisition function. In this example, different search strategy conditions A1, A2 and A3 represent different optimization schemes. In the example of FIG. 3, the numerical search range "X>1.5" may be generated, for example, in the following manner: after the user feedback module 106 receives the user's decision instruction, the user feedback module 106 generates at least one restriction condition in response to the decision instruction, and narrows down the numerical search range that the optimization schemes perform the parameter search according to the restriction condition. For example, once the user feedback module 106 limits the initial numerical search range to X>1.5, the recommendation module 104 may only search for the candidate recommended parameters from the limited numerical search range. It should be noted that the numerical search range "X>1.5" described herein is only for illustrating one embodiment of the disclosure, but not for limiting the disclosure. The construction of the numerical search range depends on the restriction condition.

The different search strategy conditions A1, A2 and A3 (which are deemed as different optimization schemes in this example) and the candidate recommended parameters obtained correspondingly are shown in Table 2:

TABLE 2

| Search strategy condition | Candidate recommended parameter |
|---|---|
| A1(UCB) | x4(A1) = 2.27 |
| A2(EI) | x4(A2) = 2.39 |
| A3(POI) | x4(A3) = 3.34 |

After generating the candidate recommended parameters, the recommendation module 104 may further select one or more recommended parameters from the candidate recommended parameters according to the weight values assigned to the respective optimization solutions, and provide the recommended parameter(s) to the user for selection.

In an embodiment, the weight values assigned to the optimization schemes may be binarized to a first value (e.g., 1, or 0) or a second value (e.g., 0, or 1). If a weight value assigned to an optimization scheme has the first value, the candidate recommended parameter provided by the optimization scheme will be selected by the recommendation module 104 as the recommended parameter. On the contrary, if the weight value assigned to the optimization scheme has the second value, the candidate recommended parameter provided by the optimization scheme will not be selected as the recommended parameter.

As illustrated in FIG. 3, if the optimization schemes A1, A2, and A3 are respectively assigned weight values of 1, 0, and 1, only the candidate recommended parameters (i.e., x4(A1)=2.27 and x4(A3)=3.34) provided by the optimization schemes A1 and A3 are selected as the recommended parameters by the recommended module 104. Therefore, the set of recommended parameters may include x4(A1)=2.27 and x4(A3)=3.34, but not include x4(A2)=2.39.

In an embodiment, the recommendation module 104 may sort the recommendation levels of the respective recommended parameters according to the weight values assigned to the optimization schemes. For example, it can be configured that when the weight value of an optimization scheme is larger, the candidate recommended parameter provided by the optimization scheme may have a higher recommendation level. The candidate recommended parameter with a higher recommendation level than the other candidate recommended parameters may be ranked in a higher priority/earlier order for the user for selection. In this embodiment, the weight value may be implemented as a non-binarized real number.

Figure 4:
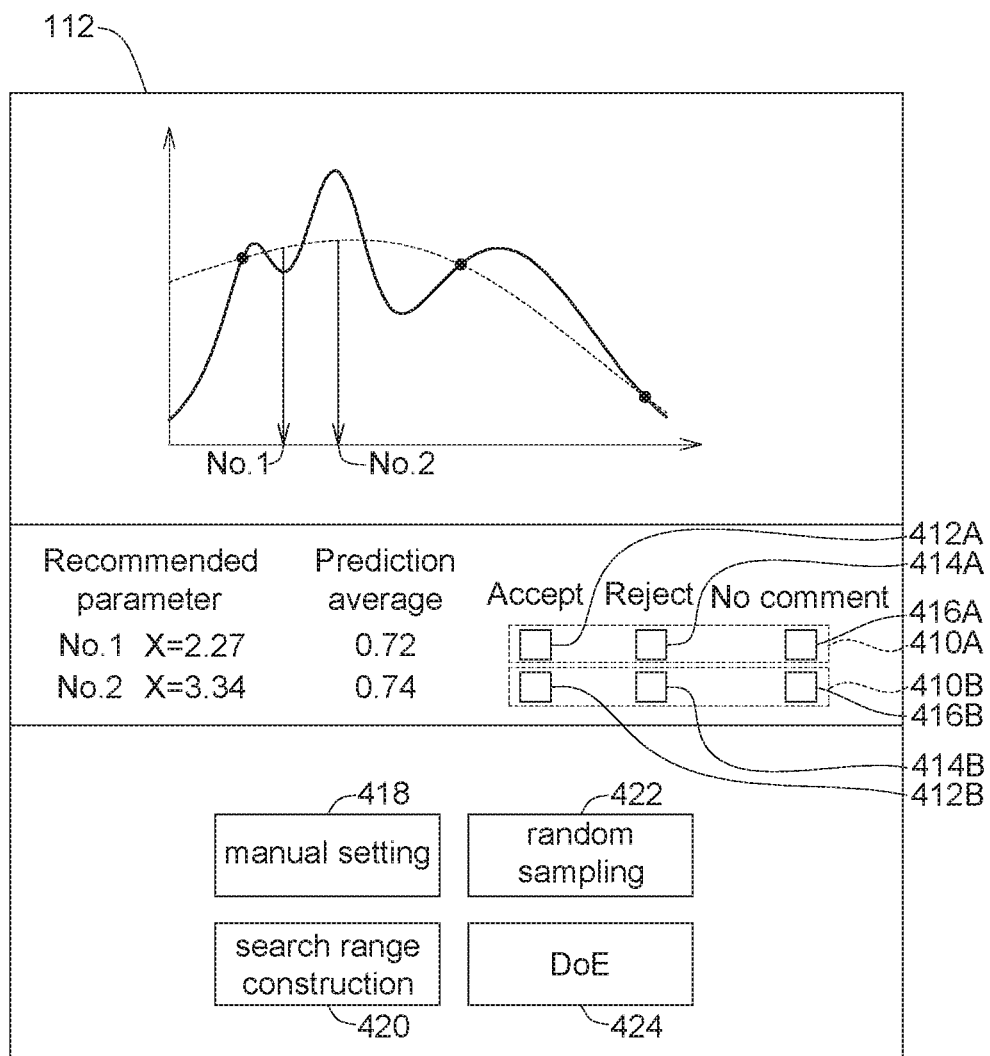
FIG. 4 is a schematic diagram of a user interface according to an embodiment of the disclosure.

FIG. 4 is a schematic diagram of a user interface 112 according to an embodiment of the disclosure. It should be noted that the example in FIG. 4 is merely one of the possible implementations of the user interface 112 for the purpose of illustration only, rather than to limit the configuration of the user interface 112 in terms of graphics, text, or a combination thereof.

In FIG. 4, the user interface 112 presents the recommended parameters (e.g., "No. 1 x=2.27" and "No. 2 x=3.34") and the overall performance indexes (e.g., the prediction averages "0.72" and "0.74") corresponding to the respective recommended parameters to the user for reference.

The user feedback module 106 may provide the user feedback fields 410A and 410B for the recommended parameters x4(A1)=2.27 and x4(A3)=3.34 in the user interface 112. Each of the user feedback fields 410A and 410B includes a plurality of parameter decision options available for the user to select. As shown in FIG. 4, the parameter decision options include the accept options 412A, 412B and the reject options 414A, 414B, and more optionally, the no-comment options 416A, 416B.

When the accept option is selected, it indicates that the user may consider that the recommended parameter corresponding to the selected accept option may be the optimal input parameter solution. Therefore, in response to the accept option being selected, the user feedback module 106 may select the recommended parameter corresponding to the selected accept option as a new input parameter.

For example, when accept option 412B is selected, it might indicate that the recommended parameter x4(A3)=3.34 corresponding to the selected accept option 412B is likely to be (or closer to) the true optimal input parameter solution after the user's professional judgment has been made. At this time, the accepted recommended parameter x4(A3)=3.34 may be deemed as a new input parameter and provided to the target system 10 for parameter experiments. The newly generated data (e.g., the corresponding new output response value) generated by the parameter experiments will be used to determine whether the new input parameter x4(A3)=3.34 causes the target system 10 to converge to meet the specification condition. If yes, it means that the recommended parameter x4(A3)=3.34 is an appropriate input parameter solution, and the parameter optimization is completed.

On the other hand, when the reject option is selected, it might indicate that the user does not consider that the optimal input parameter solution exists among the recommended parameter corresponding to the selected reject option and the neighboring input parameters of the recommended parameter. Therefore, the rejected recommended parameters and the neighboring input parameters will not be selected as the new input parameters for the parameter experiments.

When the no-comment option is selected, it might indicate that the user holds a neutral attitude toward whether the recommended parameter is the optimal input parameter. In an embodiment, if the no-comment options 416A and 416B are selected in the user feedback fields 410A and 410B, the user feedback module 106 may pick out a new input parameter from the existing recommended parameters according to an automatic selection procedure. For example, the user feedback module 106 may automatically select a recommended parameter with a better prediction average value as the new input parameter; alternatively, the user feedback module 106 may randomly select a new input parameter.

The user interface 112 may further provide additional options for the user to set the prediction model and/or the optimization solutions. As shown in FIG. 4, the additional options may include at least one of a manual setting option 418, a search range construction option 420, a random sampling option 422 and a design of experiments (DoE) option 424. The manual setting option 418 allows the user to manually set the value of the input parameter for parameter experiments. The search range construction option 420 allows the user to set the numerical search range that the optimization schemes perform the parameter search. The random sampling option 422 allows the user to randomly select a new input parameter. The DoE option 424 allows the user to input DoE parameter sets.

In an embodiment, the user interface 112 may further provide other information for the user, such as the estimated values of the prediction model for the recommended parameters, the estimated variations, and the graphically presented prediction model. As shown in FIG. 4, the user interface 112 graphically presents the prediction model of the target system 10 and the location of the recommended parameters.

After receiving the user's decision instruction, the user feedback module 106 generates a constraint condition in respond to the decision instruction, and limits the numerical search range according to the constraint condition, so that the user feedback module 106 may search for new candidate recommended parameter(s) only from the limited numerical search range. Specifically, in response to the response being selected, the user feedback module 106 may define an interval of numerical values from the input parameter space and exclude the interval of numerical values from the numerical search range, so that the numerical search range that the optimization schemes perform the parameter search is narrowed down. The interval of numerical values may at least include the recommended parameter corresponding to the reject option.

For example, if the user accepts the recommended parameter x4(A3)=3.34 and rejects the recommended parameter x4(A1)=2.27 through the user interface 112, the user feedback module 106 may construct a constraint condition correspondingly, such that the optimization schemes do not search for the optimal input parameter solutions within the interval of numerical values [2.27±δ]. If the original numerical search range is C={X>1.5}, then the new numerical search range limited by the constraint condition will be C'={X>1.5 ∩X∉[2.27±δ]}.

On the other hand, the accepted recommended parameter x4(A3)=3.34 will be input to the target system 10 as a new input parameter for parameter experiments. The output response value generated by the target system 10 in responding to the new input parameter may be used to determine whether the specification condition is met.

The decision instruction input by the user may update the user historical decision information. The user historical decision information includes for example, one or more decisions made by the user through the user interface 112 for each optimization scheme. For example, the user historical decision information may include the user's selection result for the parameter decision options (e.g., accept option, reject option, and no-comment option) in the user feedback field.

The learning and adjusting module 110 may use the updated user historical decision information to recalculate the weight values of the optimization schemes, and construct a corresponding constraint condition for limiting the numerical search range of the optimization schemes.

In an embodiment, the learning and adjusting module 110 may update the weight values of the optimization schemes according to the following equation:

$$W_i = \frac{\sum_{t=1}^{n} \gamma^{n-t+1} S_{it}}{\sum_{t=1}^{n} \gamma^{n-t+1} Q_{it}} \qquad \text{(Equation 1)}$$

where i=1, . . . , K, K is the total number of optimization schemes; $W_i$ is the weight value of the i-th optimization scheme among the K optimization schemes; n is the cumulative number of decisions made by the user for the i-th optimization scheme, including the total number of "reject", "accept" and "no-comment" options the user selected; γ represents a discount rate; $S_{it}$ represents a first-type decision representative value for the t-th decision for the i-th optimization scheme, wherein when the user selects the "reject" option or the "no-comment" option, $S_{it}$=0, and when the user selects the "accept" option, $S_{it}$=1; $Q_{it}$ represents a second-type decision representative value for the t-th decision for the i-th optimization scheme, wherein when the user selects the "no-comment" option, $Q_{it}$=0, and when the user selects the "accept" option or the "reject" option, $Q_{it}$=1.

According to Equation 1, it can be seen that the more times the user accepts an optimization scheme, the higher the weight value of the optimization scheme will be, so that the recommendation result of the optimization scheme is easier to be provided as a recommended parameter for the user to select, or has a higher degree of recommendation. In addition, the user's current decision-making may have more influence on the magnitude of the weight value than the previous decision.

For example, the decision history database 108 may maintain user historical decision information having the correspondence as described in Table 3.

TABLE 3

| Optimization scheme | Number of decisions | | | |
| --- | --- | --- | --- | --- |
| | 1 ($\gamma^4 \approx 0.66$) | 2 ($\gamma^3 \approx 0.73$) | 3 ($\gamma^2 = 0.81$) | 4 ($\gamma^1 = 0.90$) |
| UCB | Accept | No comment | Accept | Reject |
| EI | Reject | Reject | No comment | No comment |
| POI | Reject | Accept | No comment | Accept |

As shown in Table 3, the decision history database 108 records that the user accepts the UCB's recommendation results at the first and third decisions, chooses no-comment at the second decision, and rejects the UCB's recommendation result at the fourth decision.

According to the example of Table 3, the discount rate γ=0.9, therefore, the learning and adjusting module 110 may calculate the weight values of the optimization schemes according to Equation 1 as follows:

The weight value $W_1$ of the optimization scheme UCB:

$$W_1 = \frac{0.81 + 0.66}{0.90 + 0.81 + 0.66} = 0.62;$$

The weight value $W_2$ of the optimization scheme EI:

$$W_2 = \frac{0}{0.73 + 0.66} = 0;$$

The weight value $W_3$ of the optimization scheme POI:

$$W_3 = \frac{0.90 + 0.73}{0.73 + 0.90} = 1;$$

In an embodiment, the learning and adjusting module 110 may binarize the weight values $W_1$, $W_2$ and $W_3$ to 0 or 1. For example, each of the weight values $W_1$, $W_2$ and $W_3$ may be rounded off so that the optimization schemes UCB, EI, and POI may respectively have the weight values of 1, 0 and 1. In this way, when the user makes the fifth decision, only the recommendation results (i.e., the candidate recommended parameters) of the UCB and the POI will be provided as the recommended parameters for the user to select.

Figure 5:
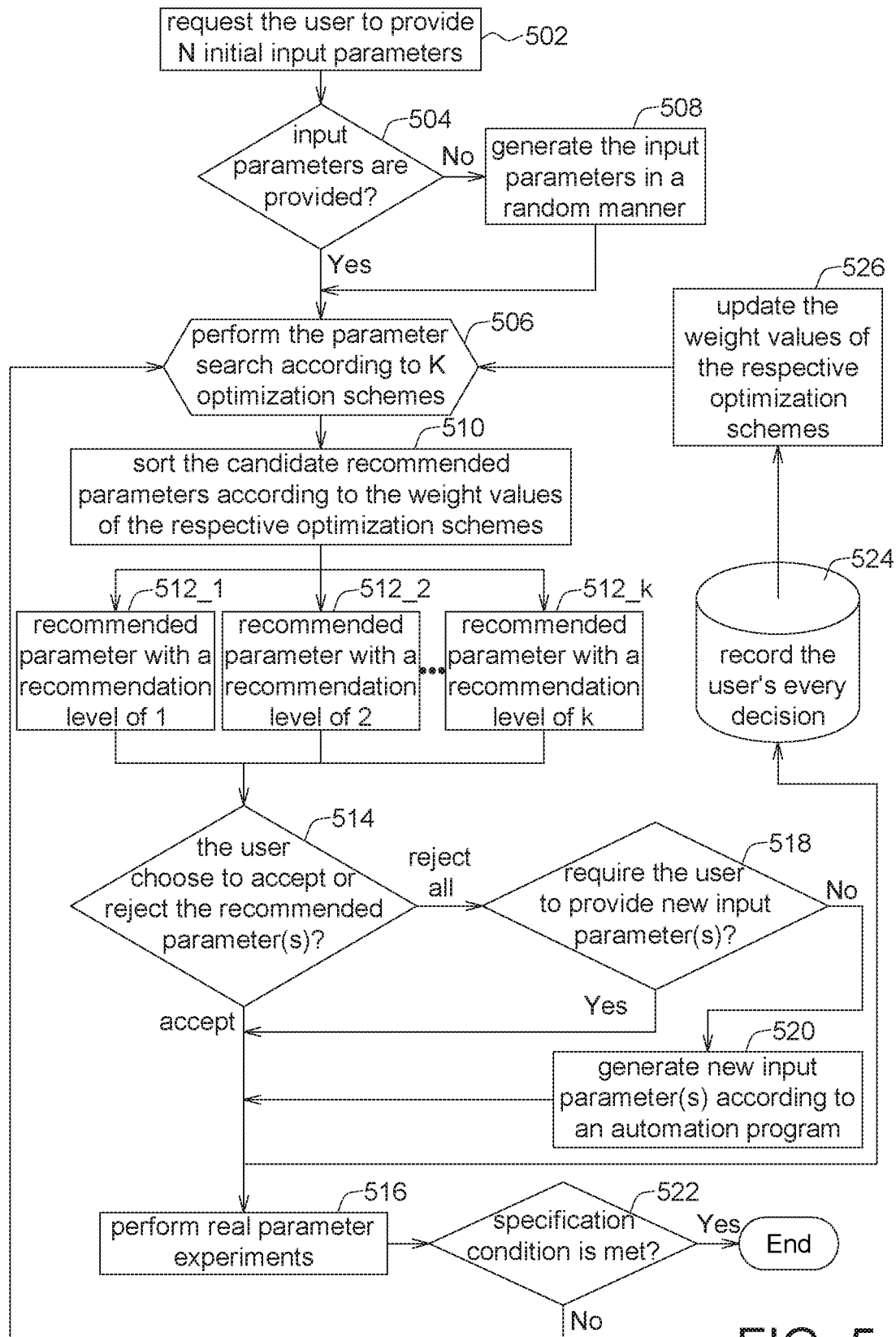
FIG. 5 is a flowchart of a parameter optimization method according to an embodiment of the invention.

FIG. 5 is a flowchart of a parameter optimization method according to an embodiment of the invention. In step 502, the retrieving module 102 requests the user to provide N initial input parameters for performing the parameter experiment. In step 504, the retrieving module 102 determines whether the user provides input parameters. If yes, in step 506 the recommendation module 104 performs the parameter search according to the K optimization schemes to provide one or more candidate recommended parameters respectively corresponding to the K optimization schemes. If not, in step 508 the retrieving module 102 generates the input parameters in a random manner. When the parameter optimization device 100 performs the parameter optimization for the first time or after the parameter optimization device 100 is reset, the optimization schemes are given initial weight values $W^0=\{W_1, W_2, \ldots, W_K\}$. For example, $W_1, W_2, \ldots, W_K$ are all initially set to 1.

In step 510, the recommendation module 104 sorts the candidate recommended parameters according to the weight values of the respective optimization schemes, so as to present the recommendation parameters with different recommendation levels, as shown in steps 512_1 to 512_k.

In step 514, the user feedback module 106 determines that the user's decision instruction corresponding to each recommended parameter is direct to the accept option or the reject option. The recommended parameters accepted by the user will be provided as new input parameters to the target system 10 for the real parameter experiments, so that the corresponding output response values are obtained, as shown in step 516.

If all the recommended parameters are rejected by the user, the parameter optimization device 100 may require the user to provide new input parameter(s) for the parameter experiments in step 518. If the user has not yet provided any new input parameter, then in step 520 the parameter optimization device 100 may generate the new input parameter(s) according to an automation program, such as randomly selecting one or more recommended parameters as the new input parameter(s), or selecting a recommended parameter with a better overall performance index for the prediction model as the new input parameter.

In step 522, the retrieving module 102 determines whether the output response value of the target system 10 has reached the specification condition after performing the parameter experiments based on the new input parameters. If yes, the parameter optimization is completed. If not, the flow returns to step 506, in which the parameter search is performed according to the K optimization schemes. In this case, the input parameters for the target system 10 include not only the initial input parameter(s) generated in step 502/508, but also the new input parameter(s) selected in step 514.

On the other hand, in step 524, the user's every decision (acceptance, rejection, or no-comment) is recorded in the decision history database 108 to form the user historical decision information. The learning and adjusting module 110 may update the weight values of the respective optimization schemes according to the latest updated user historical decision information, as shown in step 526.

The flow from step 506 to 526 may be performed retrospectively until a new input parameter that enables the corresponding output response value of the target system 10 to meet the specification condition is found.

The proposed parameter optimization method will be described below in conjunction with FIG. 6 and FIGS. 7A to 7C, which greatly speeds up the convergence of parameters.

Figure 6:
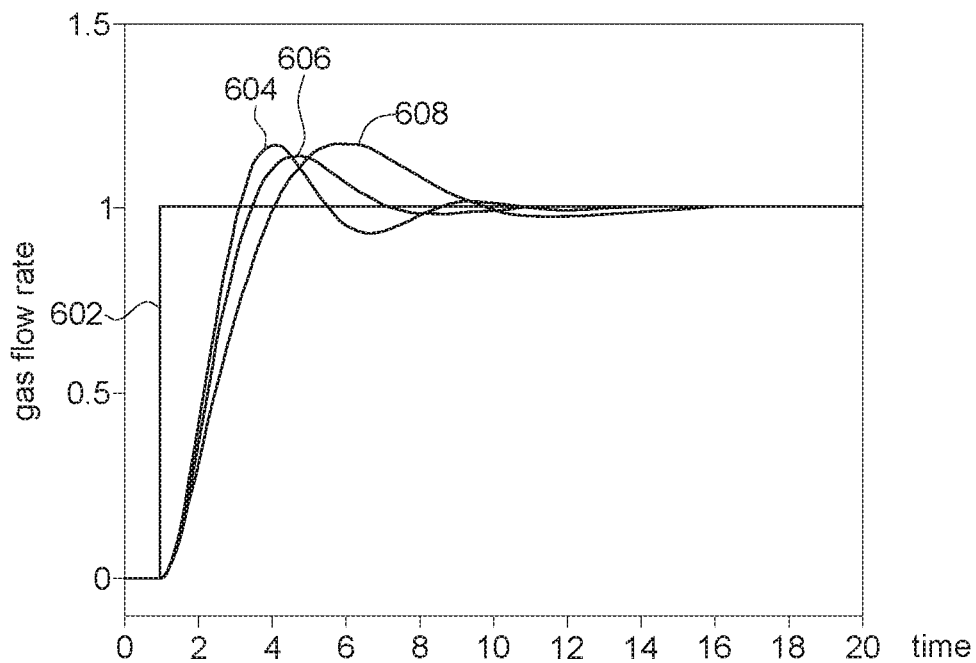
FIG. 6 is a graph showing the change of gas flow rate over time controlled by the proportional-integral-derivative (PID) controller under different parameter settings.

FIG. 6 is a graph showing the change of gas flow rate over time controlled by the proportional-integral-derivative (PID) controller under different parameter settings. The user may adjust the gas flow rate over time by setting the PID controller's proportional parameter $K_P$, the integral parameter $K_I$ and the differential parameter $K_D$. As shown in FIG. 6, the curve 602 shows the ideal gas flow rate change. The curve 604 shows the gas flow rate change when the PID controller's proportional parameter $K_P=1$, the integral parameter $K_I=1$ and the derivative parameter $K_D=0.5$. The curve 606 shows the gas flow rate change when the PID controller's proportional parameter $K_P=1$, the integral parameter $K_I=1$ and the derivative parameter $K_D=1$. The curve 608 shows the gas flow rate change when the PID controller's proportional parameter $K_P=1$, the integral parameter $K_I=1$ and the derivative parameter $K_D=2$.

In order to make the change of the gas flow rate provided by the PID controller (i.e., the target system in this example) meet the specification condition and close to the curve 602, the proposed parameter optimization method can quickly find the appropriate proportional parameter $K_P$, the integral parameter $K_I$ and the differential parameter $K_D$ (i.e., input parameters) to set the PID controller.

In this example experiment, the target value is T(t)=1, where t=0, . . . , 50. For different input parameters (i.e., parameters $K_P$, $K_I$ and $K_D$), the respective input parameter spaces are: $K_P \in [0,2]$; $K_I \in [0,2]$; $K_D \in [0,0.001]$. The specification condition for the parameter optimization is ISE<1.015.

Figure 7A:
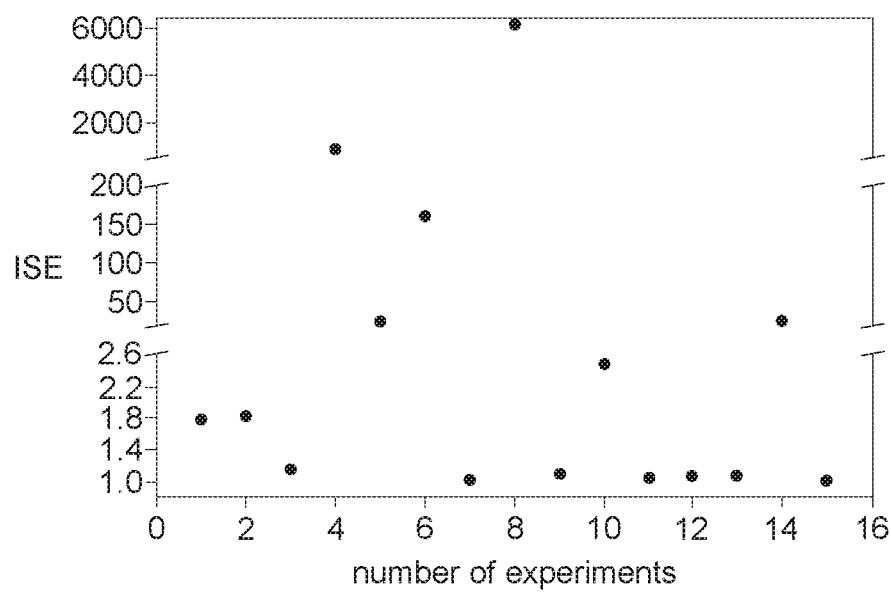
FIG. 7A shows the convergence process of a parameter optimization (optimal search path) implemented by the conventional data-driven decision making method.
Figure 7B:
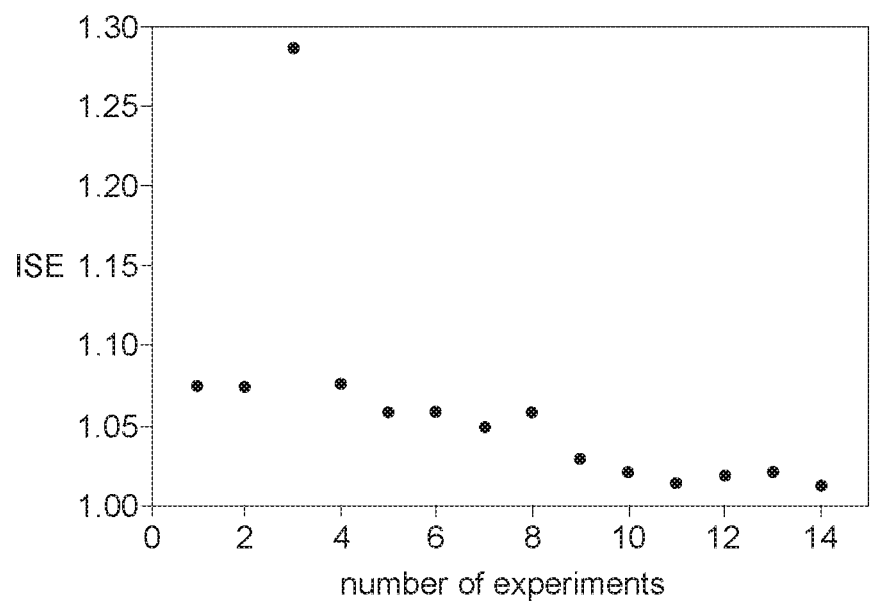
FIG. 7B shows the convergence process of a parameter optimization (optimal search path) implemented by the conventional human expert decision making method.
Figure 7C:
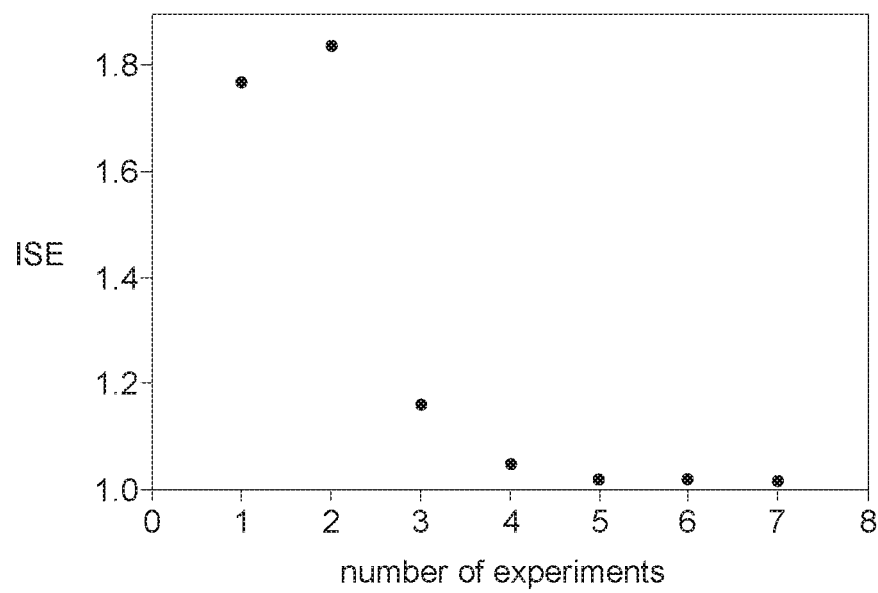
FIG. 7C illustrates the convergence process of a parameter optimization (optimal search path) implemented according to an embodiment of the disclosure.

To compare the performance of different optimization methods for this example experiment, please refer to FIGS. 7A to 7C. FIG. 7A shows the convergence process of a parameter optimization (optimal search path) implemented by the conventional data-driven decision making method (Bayesian optimization algorithm with Gaussian process in this example). FIG. 7B shows the convergence process of a parameter optimization (optimal search path) implemented by the conventional human expert decision making method. FIG. 7C illustrates the convergence process of a parameter optimization (optimal search path) implemented according to an embodiment of the disclosure.

With respect to the experimental parameter setting of the example of FIG. 7A, the matern kernel parameter in the kernel function is 2.5, and the acquisition function is EI.

With regard to the human expert decision making method used in the example of FIG. 7B, the operator is an engineer with 20 years of experience in PID control systems.

As for the experimental parameter setting of the example of FIG. 7C, the matern kernel parameter is 2.5, the adopted optimization schemes are acquisition functions EI, POI and UCB based on Bayesian optimization algorithm. When a recommended parameter is rejected, an interval of numerical values, ±δ, will be excluded from the original numerical search range, where δ is 1% of the overall numerical search range. In addition, the discount rate γ=0.9.

The performance comparison of the parameter optimization methods of FIG. 7A, FIG. 7B, and FIG. 7C is shown as follows:

TABLE 4

| Parameter optimization method | The number of experiments to meet the specification condition (ISE < 1.015) |
|---|---|
| FIG. 7A: data-driven decision making method (Bayesian optimization algorithm with Gaussian process) | 15 |
| FIG. 7B: human expert decision making method (experienced operator) | 14 |
| FIG. 7C: one embodiment of the present disclosure | 7 |

As can be seen from Table 4, the convergence rate of the proposed parameter optimization method is obviously faster than that of the conventional methods. The proposed parameter optimization method can meet the specification condition (ISE<1.015) in only 7 experiments, while the other conventional methods of FIG. 7A or FIG. 7B require more than 7 times of experiments to meet the specification condition.

The disclosure further provides a non-transitory computer-readable storage medium. The non-transitory computer-readable storage medium may include at least one of the following: an electrical connection with one or more wires, a portable floppy disk, a hard disk, a random access memory (RAM), a read only memory ROM), an erasable programmable ROM (EPROM or flash memory), optical fiber, CD-ROM, optical storage, magnetic storage, or any suitable combination thereof. The non-transitory computer-readable storage medium stores at least one executable instruction which, when executed by an electronic device, causes the electronic device to perform the parameter optimization method according to an embodiment of the disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A parameter optimization method comprising:
retrieving at least one input parameter input into a target system, at least one output response value of the target system responding to the at least one input parameter and at least one target value corresponding to the at least one output response value;
performing a parameter search on the at least one input parameter, the at least one output response value, and the at least one target value through a plurality of optimization schemes to search for a plurality of candidate recommended parameters from a numerical search range in an input parameter space;
assigning each of the optimization schemes a weight value according to a user historical decision information;
selecting at least one recommended parameter from the candidate recommended parameters according to the weight values assigned to the optimization schemes;
providing a user interface for a user to input a decision instruction for the at least one recommended parameter;
selecting at least one new input parameter from the at least one recommended parameter according to the decision instruction, inputting the at least one new input parameter into the target system, and evaluating whether at least one new output response value generated by the target system in response to the at least one new input parameter meets a specification condition;
updating the user historical decision information based on the decision instruction to adjust the weight values corresponding to the optimization schemes;
providing a plurality of user feedback fields for the recommended parameters, respectively, in the user interface, wherein each of the user feedback fields comprises a plurality of parameter decision options available for the user for selection, and the parameter decision options comprise an accept option, a reject option and a no-comment option; and
in response to determining that only the no-comment option is selected in each of the user feedback fields, selecting the at least one new input parameter from the at least one recommended parameter according to an automatic selection procedure.

2. The method according to claim 1, further comprising:
establishing a prediction model according to the at least one input parameter, the at least one output response value and the at least one target value; and
searching for the candidate recommended parameters corresponding to the prediction model from a plurality of search strategy conditions to generate a candidate recommended parameters set.

3. The method according to claim 1, further comprising:
generating at least one constraint condition in respond to the decision instruction; and
limiting the numerical search range according to the at least one constraint condition, so as to search for a plurality of new candidate recommended parameters from the limited numerical search range.

4. The method according to claim 3, further comprising:
in response to determining that the reject option is selected, defining an interval of numerical values from the input parameter space and excluding the interval of numerical values from the numerical search range so as to narrow down the numerical search range, wherein the interval of numerical values at least comprises the recommended parameter corresponding to the reject option; and in response to determining that the accept option is selected, selecting the recommended parameter corresponding to the accept option as the at least one new input parameter.

5. The method according to claim 1, further comprising: executing the method according to claim 1 recursively until the specification condition is met;
wherein the user historical decision information comprises one or more decisions made by the user on each of the optimization schemes through the user interface, the one or more decisions include user selection results for the parameter decision options in each of the user feedback fields.

6. The method according to claim 1, wherein the user interface includes at least one of a manual setting option, a search range construction option, a random sampling option, and a design of experiments (DoE) option, and the manual setting option is provided for the user to set the at least one input parameter, the search range construction option is provided for the user to set the numerical search range, the random sampling option is provided for the user to randomly select the at least one input parameter, and the option of DoE is provided for the user to input a DoE parameter set.

7. The method according to claim 1, further comprising: displaying the at least one recommended parameter and an overall performance index corresponding to the at least one recommended parameter in the user interface.

8. The method according to claim 1, further comprising: sorting a recommendation level of the at least one recommended parameter according to the weight values assigned to the optimization schemes.

9. The method according to claim 1, wherein a first optimization scheme of the optimization schemes provides at least one first candidate recommended parameter among the candidate recommended parameters, and a second optimization scheme in the optimization schemes provides at least one second candidate recommended parameter among the candidate recommended parameters, and each of the weight values is set to a first value or a second value, and the method further comprises:
setting the weight value assigned to the first optimization scheme to the first value, so that the at least one first candidate recommended parameter is selected as the at least one recommended parameter; and
setting the weight value assigned to the second optimization scheme to the second value, so that the at least one second candidate recommended parameter is excluded as the at least one recommended parameter.

10. A non-transitory computer-readable storage medium storing at least one executable command which, when executed by an electronic device, causes the electronic device to execute the method as described in claim 1.

11. A parameter optimization device comprising:
a memory; and
a processor coupled to the memory and configured for:
retrieving at least one input parameter input into a target system, at least one output response value of the target system in response to the at least one input parameter and at least one target value corresponding to the at least one output response value;
performing a parameter search on the at least one input parameter, the at least one output response value, and the at least one target value through a plurality of optimization schemes to search for a plurality of candidate recommended parameters from a numerical search range in an input parameter space;
assigning each of the optimization schemes a weight value according to a user historical decision information;
selecting at least one recommended parameter from the candidate recommended parameters according to the weight values assigned to the optimization schemes;
providing a user interface for a user to input a decision instruction for the at least one recommended parameter;
selecting at least one new input parameter from the at least one recommended parameter according to the decision instruction, inputting the at least one new input parameter into the target system, and evaluating whether at least one new output response value generated by the target system in response to the at least one new input parameter meets a specification condition;
updating the user historical decision information based on the decision instruction to adjust the weight values corresponding to the optimization schemes;
providing a plurality of user feedback fields for the recommended parameters, respectively, in the user interface, wherein each of the user feedback fields comprises a plurality of parameter decision options available for the user for selection, and the parameter decision options comprise an accept option, a reject option and a no-comment option; and
in response to determining that only the no-comment option is selected in each of the user feedback fields, selecting the at least one new input parameter from the at least one recommended parameter according to an automatic selection procedure.

12. The parameter optimization device according to claim 11, wherein the processor is further configured for:
establishing a prediction model according to the at least one input parameter, the at least one output response value and the at least one target value; and
searching for the candidate recommended parameters corresponding to the prediction model from a plurality of search strategy conditions to generate a candidate recommended parameters set.

13. The parameter optimization device according to claim 11, wherein the processor is further configured for:
generating at least one constraint condition in respond to the decision instruction; and
limiting the numerical search range according to the at least one constraint condition, so as to search for a plurality of new candidate recommended parameters from the limited numerical search range.

14. The parameter optimization device according to claim 13, wherein the processor is further configured for:
in response to determining that the reject option is selected, defining an interval of numerical values from the input parameter space and excluding the interval of numerical values from the numerical search range so as to narrow down the numerical search range, wherein the interval of numerical values at least comprises the recommended parameter corresponding to the reject option; and
in response to determining that the accept option is selected, selecting the recommended parameter corresponding to the accept option as the at least one new input parameter.

15. The parameter optimization device according to claim 11, wherein the user interface includes at least one of a manual setting option, a search range construction option, a random sampling option, and a design of experiments (DoE) option, and the manual setting option is provided for the user to set the at least one input parameter, the search range construction option is provided for the user to set the numerical search range, the random sampling option is provided for the user to randomly select the at least one input parameter, and the option of DoE is provided for the user to input a DoE parameter set.

16. The parameter optimization device according to claim 11, wherein the processor is further configured for:
displaying the at least one recommended parameter and an overall performance index corresponding to the at least one recommended parameter in the user interface.

17. The parameter optimization device according to claim 11, wherein the processor is further configured for:
sorting a recommendation level of the at least one recommended parameter according to the weight values assigned to the optimization schemes.

18. The parameter optimization device according to claim 11, wherein a first optimization scheme of the optimization schemes provides at least one first candidate recommended parameter among the candidate recommended parameters, and a second optimization scheme in the optimization schemes provides at least one second candidate recommended parameter among the candidate recommended parameters, and each of the weight values is set to a first value or a second value, and the processor is further configured for:
setting the weight value assigned to the first optimization scheme to the first value, so that the at least one first candidate recommended parameter is selected as the at least one recommended parameter; and
setting the weight value assigned to the second optimization scheme to the second value, so that the at least one second candidate recommended parameter is excluded as the at least one recommended parameter.

\* \* \* \* \*